Patented May 7, 1929.

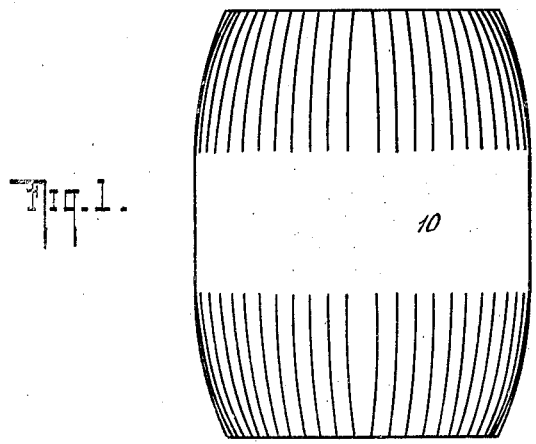
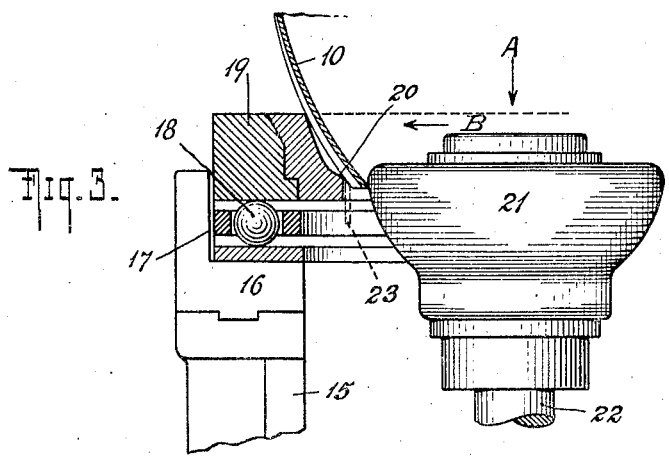
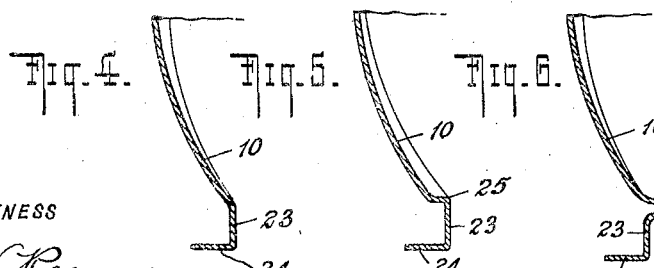

1,711,644

UNITED STATES PATENT OFFICE.

ALFONS MAUSER, OF COLOGNE-MARIENBURG, GERMANY; RUDOLPH EITH AND FERDINAND BRAUN, EXECUTORS OF SAID ALFONS MAUSER, DECEASED, ASSIGNORS TO MAUSER BARREL CO., INC, OF NEW YORK, N. Y., A CORPORATION OF NEW YORK.

PROCESS AND APPARATUS FOR REMOVING CORRUGATIONS FROM BENDABLE MATERIAL.

Application filed November 22, 1924. Serial No. 751,527.

This invention relates to methods and apparatus for the production of articles formed of sheet metal or other bendable material such as pressed paper, fibre board, celluloid, or the like capable of being bent to a desired shape. Considered more specifically, the invention relates to the production of tubular articles constructed of bendable material and having an uncorrugated end portion with a corrugated portion adjacent thereto.

The principal object of the invention is to provide a new and improved process, whereby finished articles having an entirely uncorrugated end portion and a corrugated portion adjacent thereto may be readily produced at a minimum cost of production, while securing great uniformity in the shape and dimension of the finished articles, without subjecting the material thereof to deleterious strains or distortion during the working thereof. The invention contemplates further the provision of a novel apparatus for efficiently carrying out the novel method.

Other objects will appear from the following specification and by reference to the accompanying drawings wherein my invention is described and shown by way of example as applied to the fabrication of sheet metal barrels.

In the drawings, Fig. 1 is a side elevation of a tubular barrel blank of a bilged container showing the blank after the first step of the process is completed, and the ends curved inwardly and corrugated. Fig. 2 is an end view of a portion of either end of the blank shown in Fig. 1; Fig. 3 is a fragmentary cross section through the novel apparatus for removing the corrugations at the end of the barrel blank; Fig. 4 is a partial cross section showing the profile of the end of the barrel blank after it has been worked by the apparatus of Fig. 3; and Figs. 5 and 6 are views similar to Fig. 4 showing examples of different contours or profiles which may be produced upon the end of the article.

In the fabrication of sheet metal barrels of the type indicated by the partially finished blank shown in Fig. 1 of the drawing, a hollow cylindrical blank of sheet metal is corrugated for a considerable distance from each of its ends. The corrugations decrease gradually in depth from the ends of the blank and as shown the central portion of the blank is left uncorrugated; the blank being shaped during the corrugation process to produce the bulging shape usually employed for barrels, with the corrugated portions thereof curving inwardly from the central portion to the end. The corrugated portions may be formed by any suitable process such, for example, as disclosed in my copending application for United States Letters Patent, Serial No. 748,031, filed November 6, 1924, which matured into Patent No. 1,628,259, dated May 10, 1927. As the corrugations are of the greatest depth at the extreme ends of the blank, the profile of the end presents a wavy line, for instance, as shown in Fig. 2 of the drawings. It will be obvious that the contour of this line would make the fitting, joining, or seaming of the heads or ends of the barrel a matter of great difficulty. Therefore, it is desirable to remove the corrugations for a predetermined distance inwardly of the ends so as to present a smooth fitting or seaming surface.

The method I employ for removing the corrugations consists in subjecting the end of the corrugated portion to a combined rolling and drawing pressure, the operation being somewhat analogous to the shaping of sheet metal articles by spinning, but with this important difference. In the spinning process, the action of spinning rolls causes the metal to be reduced in thickness, whereas in the process employed by me, the metal subjected to the pressure of the rolls is made somewhat stronger than the material of the blank from which the article is originally produced.

A suitable apparatus for carrying out the process as applied to the fabrication of sheet metal barrels of the type shown in Fig. 1 is illustrated in Fig. 3 of the drawing. One end of the blank 10 is engaged within a suitable chuck of a lathe or other rotating device (not shown). A fixed support or standard 15 carries a ring 16 having a recess 17, in which is mounted a ball bearing 18. A sectional backing ring 19 is placed about the other end of the blank to encircle the same and said ring is adapted to fit rotatably within the recess 17 with one of its faces in contact with the ball bearing 18. The inner periphery 20 of the ring 19 is shaped to produce the desired configuration or profile of the end portion of the blank when the corrugtions are removed therefrom. A roller 21 rotatably mounted upon the arbor 22 is introduced into the open end of the blank and the outer periphery of the roll is brought into contact with the inner circumference of the barrel a slight distance inwardly of the area from which the corrugations are to be removed. As the blank 10 is rotated, the periphery of the roller is forced into contact with the blank in the direction of the arrow B and the roller is at the same time gradually worked in the direction of the arrow A towards the marginal edge of the barrel, thereby gradually forcing the material forming the corrugations outwardly and also longitudinally, thus causing the blank to conform to the shape of the face 20 of ring 19 and form a smooth cylindrical portion as indicated by the numeral 23. After the corrugations have been entirely removed from the portion 23, as indicated by the dotted line showing in Fig. 3, the roller in the present case is then moved transversely of the blank in the direction of the arrow B to cause the material to be bent at right angles to the portion 23 and form a flange 24, which flange may be employed to form a lapped joint with the barrel heads in the manner usually employed. The ring 19 being sectional, that is to say, formed of two or more annular segments, secured together in any suitable way, may be detached, in a manner which will be readily understood, from the shaped end of the container after the profiling operation is completed and after the container with the sectional ring secured thereto is removed from the recess 17 of the support 15.

In certain cases, it may be desirable in removing the corrugations to form the uncorrugated end portions with shoulders such as indicated at 25 and 26 in Figs. 5 and 6 in order to form a limiting stop against which the inner face of the end of the closure is adapted to seat. This can be readily accomplished by shaping the face 20 of the ring 19 to correspond with the shapes indicated in the drawings, the material being worked into contact with the ring by the roller 21 in a manner which will be readily understood. With my improved method, the corrugations are not simply bent to one side or the other and brought into overlapping surface engagement with each other, nor are the corrugations merely flattened as would result from a mere hammering down thereof. In the application of my method the material of the corrugations is gradually worked longitudinally of said corrugations towards the free end of the blank and at the same time is worked transversely in opposite directions from the high points towards the valleys of said corrugations. In this way, the material is compressed from such high points towards the valleys and simultaneously is subjected to a drawing or stretching towards said free end which causes the corrugations to gradually disappear entirely and the material to become compressed or compacted.

In the application of my process to the fabrication of barrels, the very important advantage is secured of being enabled to produce a smooth seaming flange of any desired profile; the method of pressing and rolling the metal resulting in a compression of the material which not only strengthens the seaming flange but also permits the surplus material of the corrugations to be so distributed that the peripheral length of the portion of the material from which the corrugations have been removed is less than it was previous to such removal.

While I have described the process as applied to the fabrication of sheet metal barrels, it will be obvious that the principles of my invention are not limited to this specific use as the process may be employed for shaping articles of any bendable material intended for many different uses. The invention is not limited in its application to the shaping of articles having a circular cross section as it will be understood that a corrugated article having an elliptical or even polygonal cross section could be treated to remove the corrugations by the application of a combined rolling and drawing pressure in accordance with the principles of my invention.

I claim:

1. The process of producing an article of sheet metal or other bendable material from a blank having the ends thereof corrugated to form therein an uncorrugated end portion having a predetermined outline or contour and a corrugated portion adjacent to said end portion, which consists in entirely removing the corrugations from said end portion by subjecting said end portion to a combined rolling and drawing pressure against a supporting surface having an outline corresponding to the desired contour or outline to be produced.

2. The process of producing an article of sheet metal or other bendable material from a blank having the end portions thereof provided with longitudinally extending corrugations to form therein an uncorrugated end portion and a corrugated portion adjacent to said end portion which consists in subjecting the blank to pressure exerted transversely and longitudinally of said blank upon the high points of said corrugations thereby to compact and elongate gradually the material forming such corrugations, and continuing to exert said pressure until said corrugations are entirely removed from said end portions and to form smooth, even exterior surfaces of predetermined profile thereon free from corrugations or undulations.

3. The process of producing an article of sheet metal or other bendable material from a tubular blank having corrugations of gradually decreasing depth extending longitudinally from the ends of said blank towards the center thereof to form therein an uncorrugated end portion and a corrugated portion adjacent to said end portion, which consists in subjecting said end portion to a combined rolling and drawing pressure to entirely remove the corrugations therefrom and to form simultaneously said end portion into an annular flange of predetermined contour free from corrugations or undulations.

4. The process of removing corrugations from an end portion only of a deeply corrugated article of bendable material, which consists in subjecting the material of said portion to a combined rolling and drawing pressure exerted transversely and longitudinally of said material in such a manner as to compact the material and reduce the peripheral surface length of said end portion.

5. The process of removing corrugations from a portion of a deeply corrugated article of bendable material which consists in subjecting the material to a combined rolling and pressing action to reduce the peripheral surface length of the material forming the corrugations while simultaneously forming the material subjected to said action into a definite predetermined profile, the exposed surfaces of which are smooth and free from corrugations or undulations.

6. The process of removing corrugations from a deeply corrugated article of bendable material which consists in exerting a combined rolling and drawing pressure both transversely and longitudinally along the high surfaces of the corrugations to cause the material of such corrugations to be worked lengthwise of the corrugations and transversely thereof in opposite directions from said high surfaces towards points intermediate of said high surfaces.

7. The process of removing corrugations from a deeply corrugated article of bendable material which consists in exerting a rolling pressure transversely upon the high surfaces of the corrugations to cause the material of such corrugations to be worked transversely thereof in opposite directions from said high surfaces towards points intermediate of said high surfaces.

8. In an apparatus for removing corrugations from a tubular article of bendable material, a ring adapted to be detachably engaged about said article, a supporting member in which said ring is rotatably mounted, and a rotatable pressure roll for exerting pressure transversely upon the corrugations of said article.

9. In an apparatus for removing corrugations from a tubular article of bendable material adapted to be rotated by any suitable mechanism, a ring adapted to be detachably engaged about said article for rotation therewith, said ring having a surface of predetermined profile in engagement with one face of said article, a rotatable pressure roll for exerting pressure upon the opposite face of said article as it is rotated to press the material of said corrugations against said surface and force it to assume a profile corresponding to the profile of said surface, and a stationary support in which said ring is rotatably mounted.

10. In an apparatus for removing corrugations from a tubular article of bendable material, a ring adapted to be detachably engaged about said article, said ring having a surface of predetermined profile in engagement with one face of said article and a rotatable pressure roll for exerting pressure upon the opposite face of said article to press the material of said corrugations against said surface and force it to assume a profile corresponding to the profile of said surface, said roll being mounted for movement transversely and longitudinally of said surface for working said material both longitudinally and transversely of said corrugations.

11. The process of manufacturing sheet metal containers which consists in forming in a cylindrical sheet metal blank, a plurality of longitudinal corrugations of gradually decreasing depth extending from the ends of said blank and terminating short of the center thereof, whereby said blank is formed into a bilged shape having a smooth central portion and corrugated portions extending from said central portion entirely to the end of the blank, then subjecting the outer ends of said corrugated portions to pressure simultaneously exerted longitudinally and transversely of said blank for gradually working the material from the high portions of said corrugations to points between said high portions, and thereby form a smooth end portion on said blank free from corrugations or undulations.

12. The process of manufacturing a bilged container from a cylindrical sheet metal blank of uniform diameter, which consists in bending those portions of the blank which extend from adjacent the center to the ends thereof, to produce a plurality of longitudinally extending corrugations of gradually increasing depth and thereby reduce the diameter of said blank at the ends thereof without effecting any substantial change in the circumferential length of the material which forms the corrugated portion, and then removing the corrugations at the end of said blank by subjecting the material at said end to pressure to gradually compact the material and thereby reduce the circumferential length of the material at said end while maintaining the reduced diameter of the blank substantially unchanged, thus forming at the end of said blank a smooth annular surface free from corrugations or undulations.

13. The process of manufacturing a bilged container from a cylindrical sheet metal blank of uniform diameter, which consists in bending those portions of the blank which extend from adjacent the center to the ends thereof, to produce a plurality of longitudinally extending corrugations of gradually increasing depth and thereby reduce the diameter of said blank at the ends thereof without effecting any substantial change in the circumferential length of the material which forms the corrugated portion, and then removing the corrugations at the end of said blank by subjecting the material at said end gradually to pressure exerted transversely and longitudinally of said blank to compact the material at said end and thereby reduce the circumferential length of the material at said end while maintaining the reduced diameter of the blank substantially unchanged, thus forming at the end of said blank a smooth annular surface free from corrugations or undulations.

14. The process of manufacturing a bilged container from a cylindrical sheet metal blank of uniform diameter, which consists in bending those portions of the blank which extend from adjacent the center of said blank to the ends thereof, to produce a plurality of longitudinally extending corrugations of gradually increasing depth and thereby reduce the diameter of said blank at the ends thereof without effecting any substantial change in the circumferential length of the material which forms the corrugated portion, and then removing the corrugations at the end of said blank by supporting the corrugated end of the blank on one side thereof while subjecting the other side of said end to a rolling pressure exerted longitudinally and transversely of said blank to compact the material at said end and to work the material forming said corrugations gradually in opposite directions from the high surfaces to points intermediate thereof and thereby reduce the circumferential length of the material at said end while maintaining the reduced diameter of the blank substantially unchanged, thus forming at the end of said blank a smooth annular surface free from corrugations and undulations.

15. The process of manufacturing a bilged container from a cylindrical sheet metal blank of uniform diameter, which consists in bending those portions of the blank which extend from adjacent the center to the ends thereof, to produce a plurality of longitudinally extending corrugations of gradually increasing depth and thereby reduce the diameter of said blank at the ends thereof without effecting any substantial change in the circumferential length of the material which forms the corrugated portion, and then removing the corrugations at the end of said blank by subjecting the material at said end gradually to rolling pressure exerted transversely and longitudinally of said blank to compact the material at said end and thereby reduce the circumferential length of the material at said end while maintaining the reduced diameter of the blank substantially unchanged, thus forming at the end of said blank a smooth annular surface free from corrugations or undulations.

16. The process of manufacturing a bilged container from a cylindrical sheet metal blank of uniform diameter, which consists in bending those portions of the blank which extend from adjacent the center to the ends thereof, to produce a plurality of longitudinally extending corrugations of gradually increasing depth and thereby reduce the diameter of said blank at the ends thereof without effecting any substantial change in the circumferential length of the material which forms the corrugated portion, and then removing the corrugations at the end of said blank by supporting the corrugated end of the blank on one side thereof while subjecting the other side of said end to a rolling pressure exerted longitudinally and transversely of said blank to compact the material at said end and to work the material forming said corrugations gradually in opposite directions from the high surfaces to points intermediate thereof and thereby reduce the circumferential length of the material at said end while maintaining the reduced diameter of the blank substantially unchanged, thus forming at the end of said blank a ring of less diameter than the original diameter, which ring contains substantially the same amount of material as contained in the same portion of the original tube of larger diameter and the surface of which is smooth and free from corrugations or undulations.

17. The process of removing corrugations from the end portion of the side walls of a corrugated sheet metal container to form a smooth uncorrugated securing ring of predetermined profile and diameter, free from overlapping corrugations or undulations, at the end of said container, which consists in supporting one side of said walls against a rigid annular support of the desired profile and diameter, rotating said support and container in unison, and subjecting the other side of said walls to the action of a rotatably mounted roller which is forced with a combined transversely and longitudinally exerted pressure sufficient to exert a combined longitudinal drawing of the side wall material and a compacting thereof whereby said material will be gradually worked to remove the corrugations entirely therefrom and to form the end portion into a smooth surfaced ring having a profile and diameter corresponding to said annular support, the rotation of said roller being effected by the frictional contact thereof with the side walls of the rotating container.

ALFONS MAUSER.